United States Patent [19]

Graton

[11] Patent Number: 5,169,357
[45] Date of Patent: Dec. 8, 1992

[54] TORSION DAMPING DEVICE, IN PARTICULAR FOR A CLUTCH FRICTION DISC FOR A MOTOR VEHICLE

[75] Inventor: Michel Graton, Paris, France
[73] Assignee: Valeo, Paris, France
[21] Appl. No.: 718,555
[22] Filed: Jun. 20, 1991

[30] Foreign Application Priority Data

Jun. 22, 1990 [FR] France ............... 90 07866

[51] Int. Cl.⁵ .................. F16D 3/14; F16D 3/66
[52] U.S. Cl. .................. 464/68; 192/30 V; 192/106.1; 192/106.2; 464/87; 464/160
[58] Field of Search ............. 192/106.2, 106.1, 30 V; 464/81, 85, 87, 92, 160, 180, 66, 68; 74/443

[56] References Cited

U.S. PATENT DOCUMENTS

| | | | |
|---|---|---|---|
| 2,745,268 | 5/1956 | Reed | 192/106.2 X |
| 3,631,953 | 1/1972 | Snoy et al. | 192/106.1 X |
| 4,033,198 | 7/1977 | Seragnoli | 74/443 |
| 4,212,380 | 7/1980 | Billet | 192/106.2 |
| 4,433,771 | 2/1984 | Caray | 192/106.2 |
| 4,439,053 | 3/1984 | Pelz | 74/443 X |
| 4,586,596 | 5/1986 | Schmid | 192/106.2 |
| 4,613,029 | 9/1986 | Beccaris | 192/106.2 |
| 4,763,767 | 8/1988 | Lanzarini et al. | 192/106.2 |
| 4,796,728 | 1/1989 | Kanengieter et al. | 192/30 V |
| 4,883,156 | 11/1989 | Rohrle et al. | 192/106.2 |
| 4,989,712 | 2/1991 | Janiszewski | 192/106.1 |

FOREIGN PATENT DOCUMENTS

| | | |
|---|---|---|
| 3920588 | 1/1990 | Fed. Rep. of Germany . |
| 2386729 | 11/1978 | France . |
| 0084257 | 5/1983 | Japan ............... 74/443 |
| 2089472 | 6/1982 | United Kingdom . |
| 2203515 | 10/1988 | United Kingdom . |

Primary Examiner—Rodney H. Bonck
Attorney, Agent, or Firm—Longacre & White

[57] ABSTRACT

A torsion damping device comprises two coaxial parts, one of which consists of a damper plate and a hub coaxial with the damper plate, the hub and damper plate having cooperating teeth defining a circumferential clearance between them so that the hub and damper plate are able to undergo a limited relative angular displacement which is defined by a circumferential clearance between the two sets of teeth.

A ring extends parallel to the damper plate and has a further set of teeth, of resilient material, complementary to the hub teeth and meshing with the latter so as to define a further circumferential clearance between the resilient teeth and the hub teeth. This further circumferential clearance is smaller than that between the two sets of teeth of the damper plate and the hub themselves. In addition, the set of teeth on the hub is extended axially so that it can mesh with the teeth on both the damper plate and the ring.

6 Claims, 3 Drawing Sheets

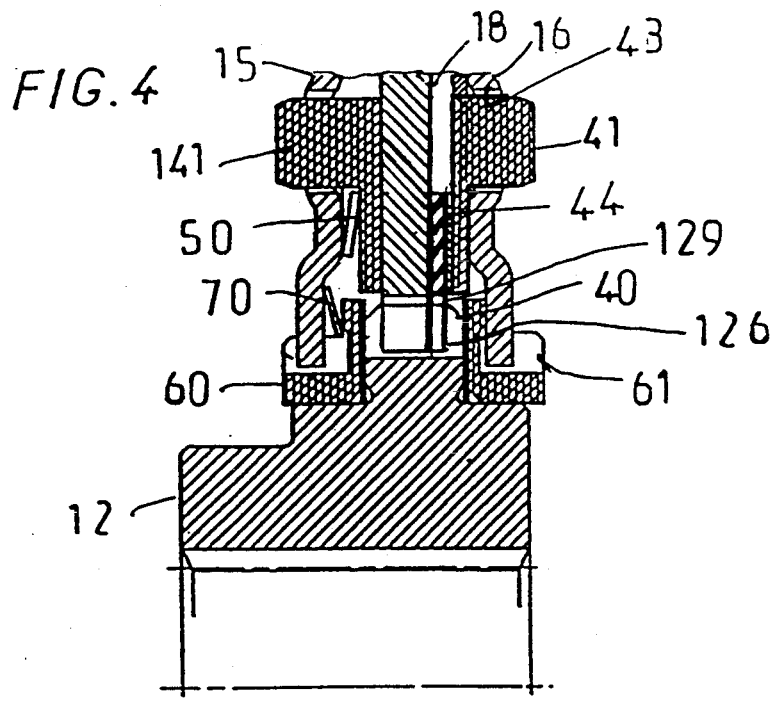
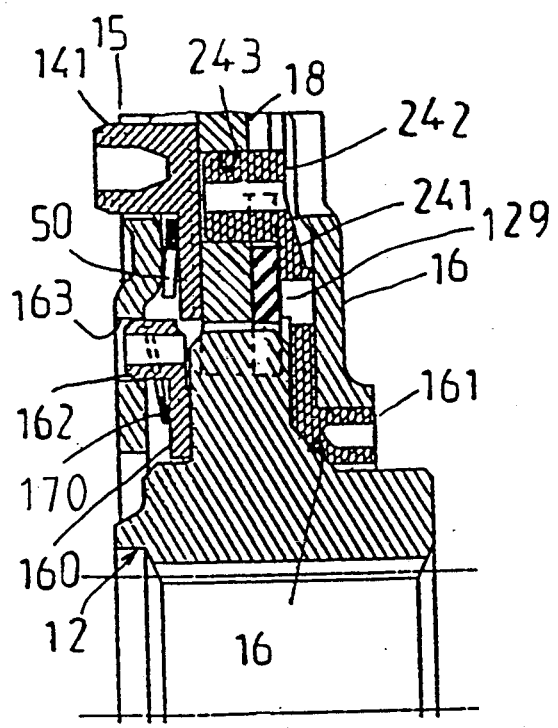
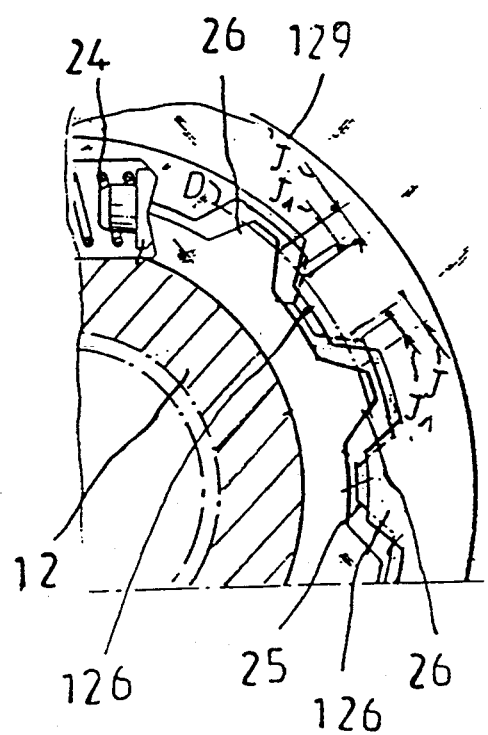

5,169,357

TORSION DAMPING DEVICE, IN PARTICULAR FOR A CLUTCH FRICTION DISC FOR A MOTOR VEHICLE

FIELD OF THE INVENTION

The present invention relates to a torsion damping device of the kind comprising two coaxial parts which are movable in rotation with respect to each other, over a limited range of displacement, against the action of first resilient means, in which one of the said coaxial parts comprises a damper plate and a hub coaxial with the damper plate, the hub and damper plate being arranged for relative rotation with respect to each other against the action of second resilient means, over a sector of angular displacement which is defined by complementary sets of teeth formed in the damper plate and hub to define a circumferential clearance between the two sets of teeth.

BACKGROUND OF THE INVENTION

A device of the above kind is described in the specification of U.S. Pat. No. 4,613,029 and that of the corresponding French published patent application No. FR 2 496 210A. In those documents, the device includes third resilient means which are interposed between the damper plate and the hub, and which are adapted to enable the set of teeth of the damper plate to come into circumferential engagement with those of the hub, with this engagement being accompanied by a braking effect such as to reduce the impact or noise associated therewith. Thus the two sets of teeth come only gently into engagement with each other, and noise is avoided.

In one embodiment, the third resilient means comprise at least one ring which is engaged around one of the teeth of one of the sets of teeth, in a groove in the tooth concerned. This ring is arranged to be compressed by the cooperating teeth of the other set. In other embodiments, resilient blocks are incorporated in recesses formed in the sets of teeth.

Such arrangements are effective when the device is new, but are susceptible to deterioration over the course of time. In addition, the sets of teeth are weakened, and the torque which can be transmitted is therefore not as high as is sometimes desirable.

DISCUSSION OF THE INVENTION

An object of the present invention is to overcome these drawbacks, by providing third resilient means in a novel form, having a long useful working life, at the same time weakening the cooperating teeth of the hub and damper plate to the least possible extent.

In accordance with the invention, a torsion damping device comprising two coaxial parts which are movable in rotation with respect to each other over a limited displacement and against the action of first resilient means, wherein one of the said coaxial parts comprises a damper plate and a hub, which are coaxial with each other and movable in rotation with respect to each other against the action of second resilient means, over a sector of angular displacement which is defined by complementary sets of teeth of the damper plate and of the hub, with these sets of teeth defining a first circumferential clearance between them, and wherein the damping device further includes third engagement of the set of teeth of the damper plate with the set of teeth of the hub while also producing a low impact braking effect, is characterised in that the third resilient means comprise a ring extending parallel to the damper plate and having a further set of teeth, of resilient material, complementary to the set of teeth of the hub and meshing with the latter to define between the teeth of said ring and that of the hub, a second circumferential clearance which is smaller than the first circumferential clearance, the device being further characterised int hat the set of teeth of the hub is extended axially so that it can mesh with both the damper plate and the said ring.

The invention gives an increase in the amount of material which is compressed prior to the teeth of the damper plate coming into positive abutting engagement with the teeth of the hub. This leads to an increase in the length of the useful life of the third resilient means. In addition, the damper plate has improved mechanical strength, because its teeth are not notched or recessed in order to accommodate the third resilient means. A similar consideration applies to the hub itself, since the hub teeth are increased in thickness. It is also possible to improve the control of stiffness, by modification of the resilient material or of the volume of compressed resilient material which is not compressed between the two sets of teeth themselves.

Finally, it will be appreciated that the second resilient means do not require any modification.

The description which follows illustrates the invention in terms of preferred embodiments of the invention, by way of example only and with reference to the accompanying drawings.

BRIEF DESCRIPTION OF THE DRAWINGS

FIG. 3 is a view, generally similar to FIG. 2, but showing part of the ring in accordance with the present invention.

FIG. 4, 5, 6 and 7 are views in axial cross section showing the inner periphery of the friction disc, in a first embodiment a second, third and fourth embodiment, respectively, of the present invention.

DESCRIPTION OF PREFERRED EMBODIMENTS OF THE INVENTION

Figure 1:
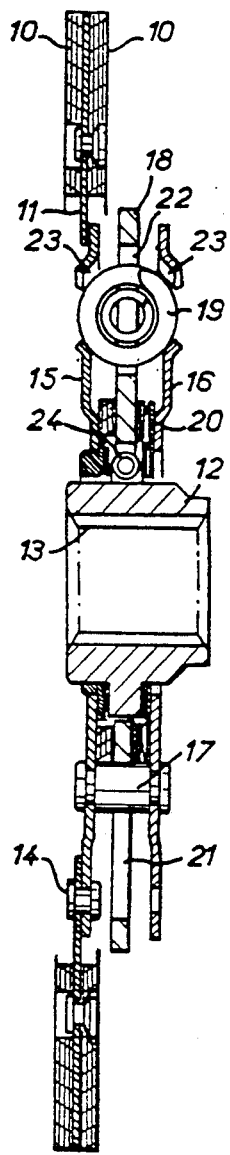
FIG. 1 is a view in axial cross section of a friction disc of the prior art.
Figure 2:
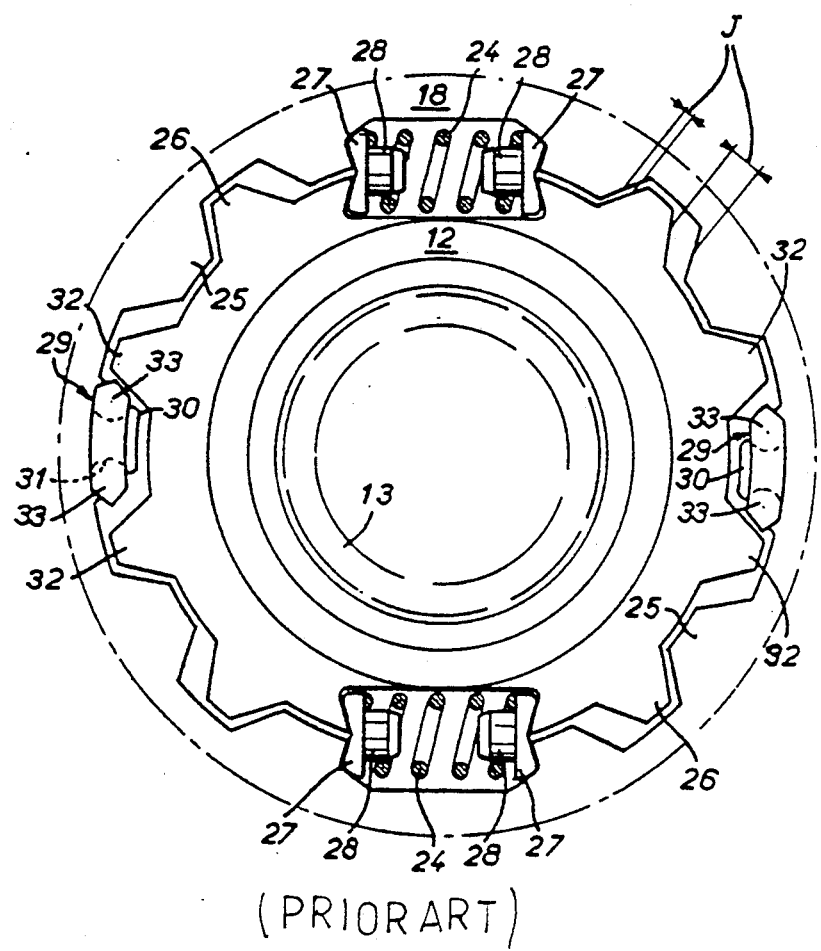
FIG. 2 is a view on a larger scale, showing, in elevation, the sets of teeth of the damper plate and the hub, in the prior art arrangement with the blocks disposed between the damper plate and the hub.

For a better understanding of the invention, this description will commence with a description of the prior art arrangement shown in FIGS. 1 and 2. This illustrates the application of a torsion damping device to a friction disc for a motor vehicle clutch, and is identical to that which is described in the specification of U.S. Pat. No. 4,613,029 and the specification of the corresponding French published patent application No. FR 2 496 210A.

The damping device shown in FIGS. 1 and 2 comprises two coaxial parts, the first of these coaxial parts comprising the elements indicated by the reference numerals 10, 11, 15 and 16. The second coaxial part comprises the elements indicated by the reference numerals 12 and 18. These coaxial parts are movable in relative rotation in an amount which is limited by the action of first resilient means 19 against which the relative rotation takes place. The second coaxial part 12, 18 itself comprises a damper plate 18 and a hub 12, which are coaxial with each other and which are movable circumferentially with respect to each other against the action of second resilient means 24, within a sector of angular displacement which is defined by complementary sets of teeth 25, 26, between which a circumferential clearance J is defined. The teeth of the set 25 are formed on the damper plate 18 and the teeth of the set 26 on the hub 12. Between the damper plate 18 and the hub 12, third resilient means are interposed. These enable the teeth 25 of the damper plate 18 to come into positive circumferential engagement with the teeth 26 of the hub 12, so as to produce a braking effect which is damped against shock. Each set of teeth 25 and 26 comprises teeth which alternate circumferentially with radial recesses.

As shown in FIG. 2, the third resilient means comprise two blocks 29 in the form of rings, each of which is arranged around one tooth 30 of one of the said sets of teeth 25 and 26, the block 29 being fitted in a groove 31 formed in the tooth 30. These blocks 29 are arranged to be compressed by the adjacent teeth 32 of the other set of teeth.

The first coaxial part of the assembly comprises friction pads 10, which are mounted on an annular carrier plate 11. The pads 10, carried by the carrier plate 11, are adapted to be gripped between the pressure plate and reaction plate (not shown) of the clutch, with the pressure plate and reaction plate being mounted on an engine shaft for rotation with the latter. The hub 12 of the second coaxial part is adapted to be engaged, through splines 13, on a driven shaft (not shown) which is the input shaft of the gearbox of the motor vehicle.

The carrier plate 11 is secured by means of rivets 14 to a guide ring 15, which is itself connected through spacers 17 to a further guide ring 16. In this example the spacers 17 are in the form of spacing bars, which extend through the damper plate 18 via slots formed in the latter. The guide rings 15 and 16 are mounted for rotation around the hub 12, without the intervention of sets of teeth, while the damper plate 18 is arranged axially between the two guide rings 15 and 16, being rotatably mounted with respect to the hub 12. The sets of teeth 25 and 26 do of course intervene between the damper plate 18 and the hub 12. The above mentioned fist resilient means 19 comprise a plurality of coil springs which are mounted in windows 22 formed in the damper plate 18, and also in further windows 23, formed in the guide rings 15 and 16 facing the windows 22 of the damper plate 18.

The second resilient means 24 are again in the form of coil springs, but are of smaller stiffness than the springs 19. The springs 24 are interposed between the damper plate 18 and the hub 12, in which they are seated through thrust insert members 27, with each spring having an insert member 27 at each end for engaging both the damper plate 18 and the hub 12. Each thrust insert member has a back face in the form of a dihedral or shallow V, and includes a spigot 28 projecting from the side of the member opposite the dihedral back face, for centering the associated spring 24. The purpose of the springs 24 is essentially to eliminate shocks or noises, such as gearbox or dead centre noises, when the torque which is transmitted by the torsion damping device is zero or very small. The springs 24 are mounted in slots which are formed partly in the inner periphery of the damper plate 18, and partly in the outer periphery of the hub 12. These slots do of course interrupt the two sets of teeth 25 and 26.

The springs 19, in combination with friction means 20, are interposed between the two coaxial parts of the assembly, and their function is essentially to damp out the vibrations which arise between the engine shaft and the driven shaft when the vehicle is running. The springs 18 and 19 can be seen to act circumferentially. The purpose of the third resilient means, i.e. the blocks 29, is to eliminate, or at least reduce, the detrimental effects of any violent and noisy impact between the sets of teeth 25 and 26 of the damper plate 18 and hub 12 respectively.

Reference is not made to FIGS. 3 to 5, in which for convenience the same reference numerals will be given to those elements which are common to the embodiments of the invention shown in FIGS. 3 to 5 and to the prior art arrangement shown in FIGS. 1 and 2.

In FIGS. 3 and 4, the third resilient means are in the form of a ring 129, which extends parallel to the damper plate 18 and which is provided with a set of teeth 126 of resilient material complementary to that of the hub 12. The set of teeth 126 meshes with the set of teeth 26 of the hub 12, and defines, between each tooth of the set 126 and the next tooth of the set 26, a circumferential clearance J1 which is smaller than the circumferential clearance J (FIG. 3) that exists between the set of teeth 25 of the damper plate 18 and the set of teeth 26 of the hub 12. The hub teeth, in the set 26, are of extended axial thickness so that the set 26 can mesh with both the set 25 of the damper plate 18 and the set 126 of teeth on the resilient ring 129.

The teeth in the set 126 are trapezoidal in shape (as are the teeth in the sets 25 and 26). The set of teeth 126 engages with a clearance in the complementary radial recesses that separate the teeth of the set 26 of the hub 12. The set of teeth 126 extends parallel to the set of teeth 25, with its teeth in a circumferential overlapping relationship with those of the set of teeth 25, due to the clearances J and J1. Each tooth of the set 126 is in a radial overlying relationship with the greater part of the adjacent tooth of the set 25, with only the radially inner end of the latter not being overlain by the associated tooth 126. It will of course be realised that the extent to which this is true depends on the applications to which the arrangement is to be put.

In this example, the whole of the resilient ring 129 is of a resilient material such as rubber. It will however be realised that a part of this ring may be made in rigid form, given that is inner periphery, i.e. at least its teeth 126 will be of a resilient material for cooperating with the set of teeth 26.

Because the dampening means for damping the impact between the teeth 25 and 26 is now provided by the resilient ring 129, none of the teeth 25 and 26 is notched, and these teeth are able to make positive abutting contact with each other. This is possible because the ring 129 extends parallel to the damper plate 18.

In FIG. 4, the hub 12 has a flange 40 at its outer periphery. The set of teeth 29 is formed in this flange 40, and the ring 129 is attached to the damper plate 18.

The ring 129 is inserted axially between the guide ring 16 and the damper plate 18. More precisely, between the guide ring 16 and the damper plate 18, a series of components is interposed. These consist, in this order, of a friction ring 41, a metal ring 44, and the ring 129. The friction ring 41 is preferably made of a material having a low coefficient of friction such as polyamide. It is secured to the guide ring 16 for rotation with the latter, by means of a set of spigots 42 which are engaged in corresponding holes 43 formed through the guide ring 16. The metal ring 44 is secured to the resilient ring 129 by suitable adhesive fastening.

An axially acting resilient ring 50 and a friction ring 141 are interposed in that order between the other guide ring 15 and the damper plate 18. The friction ring 141 is substantially identical to the friction ring 41, and has spigots similar to the spigots 42 engaged in holes in the guide ring 15, so as to be coupled to the guide ring 15 for rotation with the latter. The resilient ring 50 is in this example in the form of a Belleville ring. It bears on the guide ring 15 and on the friction ring 141, and causes the rings 41, 44 and 129 to be gripped between the damper plate 18 and the other guide ring 16.

Anti-friction bearings 60 and 61, of L-shaped cross section, are interposed radially between the inner periphery of each ring 15, 16 and the outer periphery of the hub 12, respectively. These bearings 60 and 61 are interposed axially between the hub flange 40 and each guide ring 15, 16 respectively. In the present example, the bearings 60 and 61 are identical to each other, and are coupled in a mating relationship with the guide rings 15 and 16, for rotation with these guide rings. To this end, the bearings 60 and 61 are provided with crescent shaped projections (as shown in FIG. 1 of the above mentioned U.S. Pat. No. 4,613,029 and the specification of the corresponding French published patent application No. FR 2 496 210A). These projections engage in complementary recesses formed in the inner periphery of the guide rings 15 and 16.

A further axially acting resilient ring 70 is disposed radially within the Belleville ring 50. The ring 70 is again the form of a Belleville ring, and bears on the guide ring 15 so as to urge the anti-friction bearing 60 into contact with the hub flange 40, so that the radial portion of the other anti-friction bearing 61 is griped axially between the guide ring 16 and the hub flange 40. In this example, the force exerted by the resilient ring 70 is smaller than that exerted by the resilient ring 50.

Figure 6:
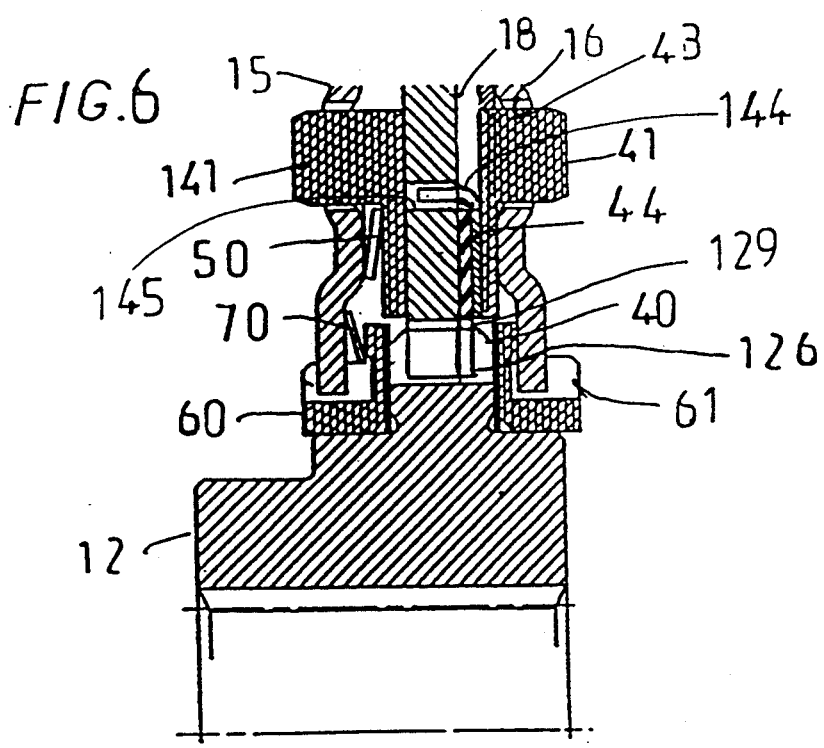

The resilient ring 129 is secured to the damper plate 18 by adhesive bonding. In a modification (FIG. 6), the ring 129, fixed to the metal ring 44, may be fixed with respect to the damper plate 18, for rotation with the latter, by means of axially extending lugs 144 of the metal ring 44 engaging in complementary openings 145 formed in the damper plate 18. This is indicated in FIG. 6. These lugs extend from the outer periphery of the metal ring 44 and lie radially outside the resilient ring 129. In all cases, the resilient ring 129 is mounted in the position seen in FIG. 3 in the normal or rest position of the assembly, with the teeth of the set 126 overlapping those of the set 25 circumferentially.

It is of course possible to couple the resilient ring 129 to the metal ring 44 for rotation with each other by mating cooperation: to this end, the ring 129 then has slots for cooperating with the said lugs of the metal ring 44. These slots are preferably formed in a rigid portion of the ring 129 and the outer periphery of the latter.

In a further modification, the damper plate 18 may be fixed with respect to the ring 129, for rotation with it, by an axial gripping action caused by the Belleville ring 50. Whatever the arrangement, since the springs 19 are stiffer than the springs 24, in operation the damper plate 18 is initially enabled to be displaced in rotational movement with respect to the hub 12, against the action of the springs 24 and friction means 70, 60, 61, until the teeth of the set 26 come into contact with those of the set 126 of the resilient ring 129. This has a braking effect, and on continuation of the movement the teeth 26 and 25 then make contact with each other. It will be noted that the resilient material of the ring 129 may be displaced freely in the upstream direction, and the contact zone between the teeth of the sets of teeth 126 and 26 is more extended than in the case of the prior art arrangement shown in FIG. 2.

In a second stage of operation following the first stage described above, the damper plate 18 now being fixed with respect to the hub 12 so that they rotate together, the springs 19 become compressed; and the friction means 50, 141, 44, 41 come into action. During this movement, friction takes place between the rings 41 and 44. In this way the metal ring 44 protects the resilient ring 129.

In a modification, the anti-friction bearing 61 is replaced by a conical bearing 161 shown in FIG. 5, which is in contact with a conical surface 164 formed on the hub 12. The other anti-friction bearing 60 is omitted, being replaced by a ring 160 which is in contact with the hub flange 40. This ring 160 includes spigots 162, which are engaged in corresponding holes 163 formed in the guide ring 15, so as to couple it in rotation with the latter. The resilient ring in FIG. 5, denoted by the reference numeral 170 and corresponding with the resilient ring 70 in FIG. 4, is coupled in rotation to the ring 160 by mating cooperation, and is provided with slots cooperating with the spigots 162.

Although in the arrangement of FIG. 5, the resilient ring 50 and friction ring 141 of FIG. 4 remain unchanged, the other friction ring 41 is replaced by a ring 241, and the metal ring 44 is omitted. The ring 241 bears on the guide ring 16, and is formed with spigots 242 which engage in corresponding holes 243 formed in the damper plate 18, so that the ring 241 is coupled to the latter for rotation with it. The rings 161 and 241 can of course be made as a single component if desired.

Figure 7:
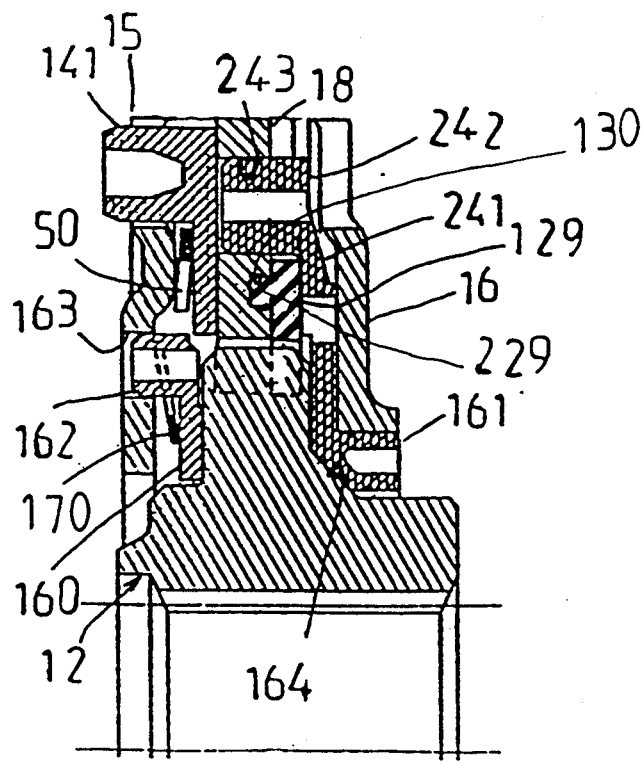

In a first version of this embodiment, the ring 129 is secured by adhesive bonding to the damper plate 18. In a second version, it is secured by adhesive bonding to the ring 241. In a third version (which is indicated in FIG. 7), the ring 129 is coupled in rotation to the damper plate 18 by means of spigots 229 which extend into a complementary recess 130 formed in the damper plate 18, and which is also shown in FIG. 7. These structures can of course be reversed, with the damper plate 18 then carrying the spigots and the ring 129 the corresponding holes. In a fourth version of this embodiment, the ring 129 is coupled to the damper plate, for rotation with the latter, by a mating coupling arrangement with the spigots 242, the ring 129 then having slots in its outer periphery cooperating with these spigots. The ring 129 is then preferably, and as in the second version described above, in two parts which are fixed to each other. These two parts consist of an inner part, made of a resilient material and carrying the set of teeth 126; and a rigid outer part which carries the recesses or spigots. These arrangements all operate in the same was as that shown in FIG. 1.

The present invention is of course not limited to the embodiments described above. In particular, the resilient means 19 may form part of a pre-damper which is disposed between the damper plate 18 and one of the guide rings 15 and 16, in the manner described in the specification of U.S. Pat. No. 4,883,156, it being understood that the set of teeth of the hub flange is extended axially in order to mesh with the ring such as the ring 129 that is provided in accordance with the present invention. Preferably then, this latter ring is coupled in rotation with the spacer elements, by means of a mating coupling, for which purpose it is provided with slots in which the spacer elements are engaged.

In a further modification the resilient means 19 and 24 may consist of blocks of resilient material. Finally, the clearances J and J1 may not be symmetrical with each other in the rest position of the assembly, this being decided as appropriate for the particular application to which the assembly is to be put.

What is claimed is:

1. A torsion damping device comprising:
   a first rotatable part;
   a second rotatable part;
   means mounting said first and second rotatable parts coaxially with each other for limited relative rotation with respect to each other; and
   first resilient means coupling said first and second rotatable parts together whereby said relative rotation is against the action of said first resilient means, the first rotatable part comprising the hub, a damper plate coaxially surrounding the hub, and second resilient means coupling the hub and damper plate together in rotation, whereby to permit limited relative rotation between the hub and damper plate against the action of the second resilient means, the hub having a first set of radial teeth, the damper plate having a second set of radial teeth cooperating with said first set and defining a first circumferential clearance between the two sets of teeth, whereby to determine a range of angular displacement for said relative rotation between the hub and damper plate, the torsion damping device further including third resilient means associated with the teeth for enabling the teeth of the first set and those of the second set to come into positive circumferential engagement with each other while producing a low-impact braking effect, wherein the third resilient means comprises a resilient toothed ring coaxial and parallel with the damper plate, the resilient toothed ring having a third set of teeth of resilient material complementary to said first set of teeth and defining with the latter a second circumferential clearance smaller than the said first circumferential clearance, the first set of teeth being extended axially so as to mash with both the second and third sets of teeth, and said third set of teeth being dimensioned to allow limited relative rotation between said resilient ring and said hub prior to engagement between said first and third sets of teeth.

2. A torsion damping device according to claim 1, wherein the resilient toothed ring is coupled to the damper plate by adhesive fastening.

3. A torsion damping device according to claim 1, wherein the means coupling the said resilient toothed ring to the damper plate comprises a further ring, the device further including means coupling the said further ring to the damper plate for rotation with the latter.

4. A torsion damping device according to claim 3, wherein the said resilient toothed ring and the said further ring together define mating profiled whereby the damper plate and the said further ring are coupled together.

5. A torsion damping device according to claim 1, wherein the damper plate is formed with a plurality of recesses, the said resilient toothed ring having a plurality of spigots cooperating with the said recesses in the damper plate whereby to coupled the resilient toothed ring to the damper plate for rotation together.

6. A torsion damping device according to claim 1, wherein each tooth of the said third set of teeth covers the greater part of an axially adjacent tooth of the said second set of teeth of the damper plate.

* * * * *